United States Patent [19]
Straus

[11] Patent Number: 5,869,967
[45] Date of Patent: Feb. 9, 1999

[54] DEVICE FOR THE DETECTION OF OBJECTS, ESPECIALLY EXPLOSIVE OBJECTS, LYING IN THE EARTH

[75] Inventor: Reinhold Straus, Mosbach, Germany

[73] Assignee: Lobbe Xenex GmbH & Co., Iserlohn, Germany

[21] Appl. No.: 875,310

[22] PCT Filed: Jan. 25, 1996

[86] PCT No.: PCT/EP96/00297

§ 371 Date: Jul. 23, 1997

§ 102(e) Date: Jul. 23, 1997

[87] PCT Pub. No.: WO96/23236

PCT Pub. Date: Aug. 1, 1996

[30] Foreign Application Priority Data

Jan. 27, 1995 [DE] Germany .................. 195 02 455.9

[51] Int. Cl.⁶ ................ G01V 3/165; F41H 11/12; F42B 8/28
[52] U.S. Cl. .................. 324/326; 324/260; 324/262; 324/345; 89/1.13
[58] Field of Search ................ 324/326, 327, 324/329, 345, 244, 260, 262, 67; 434/1; 89/1–13; 102/425; 340/551

[56] References Cited

U.S. PATENT DOCUMENTS

| | | | |
|---|---|---|---|
| 4,021,725 | 5/1977 | Kirkland | 324/326 |
| 4,312,600 | 1/1982 | Schaaf et al. | 404/6 |
| 5,132,622 | 7/1992 | Valentino | 324/326 |
| 5,452,639 | 9/1995 | Aulenbacher et al. | 89/1.13 |

FOREIGN PATENT DOCUMENTS

| | | |
|---|---|---|
| 0 226 700 A1 | 7/1987 | European Pat. Off. . |
| 51 551 | 2/1943 | France . |
| 35 26 492 A1 | 1/1987 | Germany . |
| 4227461 | 2/1993 | Germany . |
| 2 122 553 | 1/1984 | United Kingdom . |

*Primary Examiner*—Jay M. Patidar
*Attorney, Agent, or Firm*—Panitch Schwarze Jacobs & Nadel, P.C.

[57] ABSTRACT

There is described a device for the detection of objects lying in the earth which, irrespective of topography, soil structure and state of the terrain, permits high surface yields with great precision in identifying the position of the objects to be detected without endangering the operating personnel. On a mobile device (10) is arranged at least one jib (20) swivellable about a vertical axis, on whose free end are arranged adjacent to each other several measuring heads (40) for sweeping over strip-shaped surface areas (2a–d) of the terrain to be investigated. With the measuring heads (40) on the free end of the jib (20) at least one ground marking device (60) is arranged for distinguishing the find site determined by the measuring heads (40). The ground marking device (60) includes a paint spraying device (61) as well as a stake marking device (66) next to each measuring head (40).

18 Claims, 14 Drawing Sheets

DEVICE FOR THE DETECTION OF OBJECTS, ESPECIALLY EXPLOSIVE OBJECTS, LYING IN THE EARTH

BACKGROUND OF THE INVENTION

The invention relates to a device for detecting objects lying in the earth, especially explosive objects, such as non-exploded mines, grenades, munitions or bombs, with a mobile device on which a jib swivellable at least about a vertical axis is mounted, on the free end of which several measuring heads are arranged.

Former military sites often have explosive objects in the earth which must be removed from the earth before the terrain can be directed toward a new use. Since it is usually a question of very large areas, it would be too expensive to remove all the earth in the upper soil layers and search for the objects mentioned.

In order to be able to implement cleanups of old military encumbrances with a reasonable expenditure, it is first of all necessary to detect not yet exploded objects and to remove only the earth at the find sites and cleanse it of explosive objects in a second step. Since large surface segments of land must be combed, conventional detection devices are not practicable for this and are associated with great dangers for life and limb of the personnel.

With known manual searching apparatus which are guided by operators over the ground, only relatively narrowly restricted areas can be searched with a reasonable expenditure of time. Moreover, the danger for operating personnel is very great, because the person must walk over the grounds to be searched with the metal detector and can cause the objects detected to detonate through inattention under certain circumstances.

Moreover, vehicles are known on the front side of which metal detectors are firmly installed, so that only the area in front of the vehicle can be searched for explosive objects. Even with these vehicles, the surface yield is not sufficient. A further disadvantage consists in that, as a rule, only flat ground can be examined because the measuring heads are rigidly fastened on the vehicle. Uneven terrain therefore leads to considerable errors in identifying the location of the objects, which has as a consequence that the cleanup troops are either exposed to a heightened risk or must carry off more ground than is necessary in order to discover the objects, or that on account of the cants in troughs dead areas arise, so that many explosive objects are not located at all.

U.S. Pat. No. 4,021,725 describes a mine detecting apparatus which has a jib on the front side of a mobile device on whose free end a detection device is arranged. The jib is swivellable around a vertical and/or horizontal axis. The detection device possesses several probes in order be able to construct the position of magnetic dipoles and a map with the position of these discovered objects. During the forward movement, the jib executes an oscillating swinging movement. Owing to the fact that the probes are arranged in a row transverse to the direction of travel, the terrain is only probed along a line. Further, the mine detecting apparatus is usable only for level terrains. As soon as uneven terrains emerge, recognition of the position is erroneous, or mines located in the soil are not identified at all.

DE 42 27 461 A1 describes a mine reconnaissance and detector system which has a remote-controlled vehicle which is connected with a processing and control unit through an interconnecting cable. The sensor device is installed firmly on the mobile device, so that with uneven terrain erroneous measurements likewise occur. The marking device is located at the back end of this vehicle with the disadvantage that the exact position of discovered objects cannot be marked.

DE 35 26 492 A1 describes an apparatus for discovering metal, particularly mines. The metal seeking probe has a spool, whose diameter is greater than half the width of the vehicle, on which the probe is fastened by means of a carrier device. The carrier device is displaceable only in a vertical direction.

FR51551 describes a mobile mine searching device with a jib which is swivellable in a vertical direction about a horizontal axis, on which jib is suspended a net-shaped arrangement with measuring heads.

SUMMARY OF THE INVENTION

It is therefore an object of the invention to make available an apparatus for detecting objects located in the ground which, independently of topography, soil structure and state of the terrain, makes possible high surface yields with great exactitude with reference to identification of the position of the objects to be detected, and without endangering the operators.

This object is accomplished with a device in which the jib is constructed in at least two parts from a rear jib and a front jib, wherein the front and the rear jibs are swivellable in a vertical direction independently of each other, the measurement heads for sweeping over strip-shaped surface areas of the terrain to be examined are arranged alongside one another, and in which at least one ground marking device for distinguishing the find sites found by the measurement heads is allocated to the measurement heads at the free end of the jib. The at least two part construction of the jib has the advantage that the measurement heads can always be held at the predetermined distance from the ground, so that uneven soil formations can also be covered. Advantageous embodiments are objects of the dependent claims.

In order to prepare the terrain to be examined for use of the device of the invention, it is only necessary first of all to lay out travel paths, for example with a remote controlled grenade mill. This way, objects situated in the surface area, for example, grenades, munitions, bombs or mines, are removed or detonated, so that in the area of the travel paths, the vehicle of the invention can be moved without danger. In the event that further explosive material is found lying still deeper in the travel path area, this is not dangerous for the apparatus to such extent, because the mobile device preferably involves a vehicle with low surface pressure, or the ground located in front of the vehicle can be searched before driving over it and, if necessary, cleared.

In accordance with a preferred embodiment, the mobile device is a tracked vehicle in which the weight of the overall device is distributed over a large contact area. Further advantages of a tracked vehicle are the high tractive capacity, good maneuverability, good ability to climb and great stability, so that even difficult terrain formations can be searched.

The vehicle is moved forward on the travel path and, in accordance with one possible operating method, stopped at certain predetermined intervals. With the jib arc-shaped surface areas are subsequently swept, the width of which depends on the type and number of the measurement heads arranged alongside one another on the free end of the jib. In accordance with another possible mode of operation, the jib is swung into a predetermined position, and path-shaped surface areas parallel to the travel path can be searched by continuous forward movement of the mobile device.

The jib can either be arranged on the chassis of the vehicle or on a frame enclosing the test room cabin. In the test room cabin the evaluation instruments of the measurement head signals and the operating personnel are housed. Preferably, installations for the overriding control of the mobile device are also accommodated in the test room cabin, so that the navigator can assume command over the vehicle in danger situations which the driver does not recognize.

Preferably, the measurement heads are based on the principle of magnetic navigation, so that appropriate measured curves of the ground examined can be generated. If a measured curve belonging to a measurement head shows a deflection, the jib is moved back and forth over the find site for exact localization. Afterward, the jib is held in this position and the find site marked. The ground marking device provided for this includes a stake marking device which is preferably equipped with stakes of nonmagnetic material.

At the find site located, one of the stakes is inserted into the ground for rough marking. So that the stakes are visible from a distance, they are preferably provided with a luminous paint. Variously configured stakes can be used according to soil characteristics. For hard soils, a hardened stake tip is of advantage. If the stakes for any reason cannot be inserted into the ground, the stakes can be constructed as self-uprighting marking buoys. Preferably, they possess a shaft with a round, for example hemispherical, foot element, wherein the materials for the shaft and the foot element are so coordinated that the center of gravity of the stake is located in the foot element. Since location over bodies of water is also anticipated, find sites must also be marked in the water. For this, floating stakes are used.

In order to be able to mark several find sites, the stake marking device preferably has at least one rotatable mounting star or a rotatable mounting drum which is outfitted with the stakes and in a preferred configuration is drivable by a tension belt, or especially a rubber tension belt. The stake marking device is preferably constructed as self-recharging. Stops are provided so that unstressing the tension belt is possible only when the mounting star or drum is empty.

In addition to or instead of the stake marking device, the ground marking device can have a paint marking device by means of which a paint marking is sprayed on the ground. As the paint marking device is preferably arranged next to each measurement head, a fine marking of the find site is thereby possible. The paint spraying device preferably has a valve and a spraying nozzle which is connected to a paint pressure conduit.

Between the front and the rear jib, an intermediate jib can be arranged which is telescopable by means of a linear drive device, so that in addition the distance between the measurement heads and the vehicle can also be changed. By a suitable soil distance measuring device on the free end of the jib, the movement of the jib can be controlled completely automatically, so that the predetermined distance of the measurement heads to the soil is always maintained. In this way, measurement exactitude is additionally improved.

In order not to influence negatively the detection of predominantly metallic objects, at least the front jib is manufactured from non-magnetizable material, preferably plastic. Even the component parts of the ground marking device must therefore not consist of magnetic material. This specification makes it necessary to operate the stake marking device and the paint marking device, for example, with compressed gas, especially compressed air, since electrical devices such as motors or the like can influence the measurement signals.

The stake marking device is connected to an intermediate container through a first gas conduit, which is connected with a compressor device through a second gas conduit, wherein the cross section of the second gas conduit is smaller than the cross section of the first gas conduit, and wherein a switchable valve is arranged after the intermediate container in the first gas conduit. By having the intermediate container remote from the stake marking device, for example being arranged at the front end of the rear jib, an electrically switchable valve can be used thereby disturbing the measurement heads.

The measuring heads are preferably hung freely swinging, so that a perpendicular measurement direction is always maintained. Especially on uneven terrain, measurement exactitude with respect to position recognition is distinctly improved this way. For this, the test heads are preferably attached to the jib or a special probe holder through a parallelogram suspension.

For special uses, for example for examining extremely steep slopes, it can be of advantage if the measuring heads are rigidly attached to the front jib or to the probe holder. It is thereby possible to align the probes perpendicular to the slope surface. Preferably, the measuring heads are hereby fastened to the jib or probe holder with cords or vibration damping swinging bars or by pliable elements, such as elastic tubes or rods. If during the movement of the jib the measuring heads should strike an obstacle, the elastic suspension yields despite the rigid arrangement, so that the measuring heads are not damaged.

Since the spraying nozzle is advantageously arranged adjacent to the respective measuring head, an appropriate suspension like that of the measuring heads is provided. The end of the paint pressure conduit provided with the valve and the spraying nozzle can therefore likewise be suspended swinging freely on the front jib or on the probe holder.

In accordance with a further embodiment, the probe holder can be rotated about a vertical and/or horizontal axis. In this way it is possible to change the width of the strip-shaped surface area to be examined.

BRIEF DESCRIPTION OF THE DRAWINGS

Exemplary embodiments are explained in greater detail below on the basis of drawings.

DETAILED DESCRIPTION OF THE INVENTION

Figure 1:
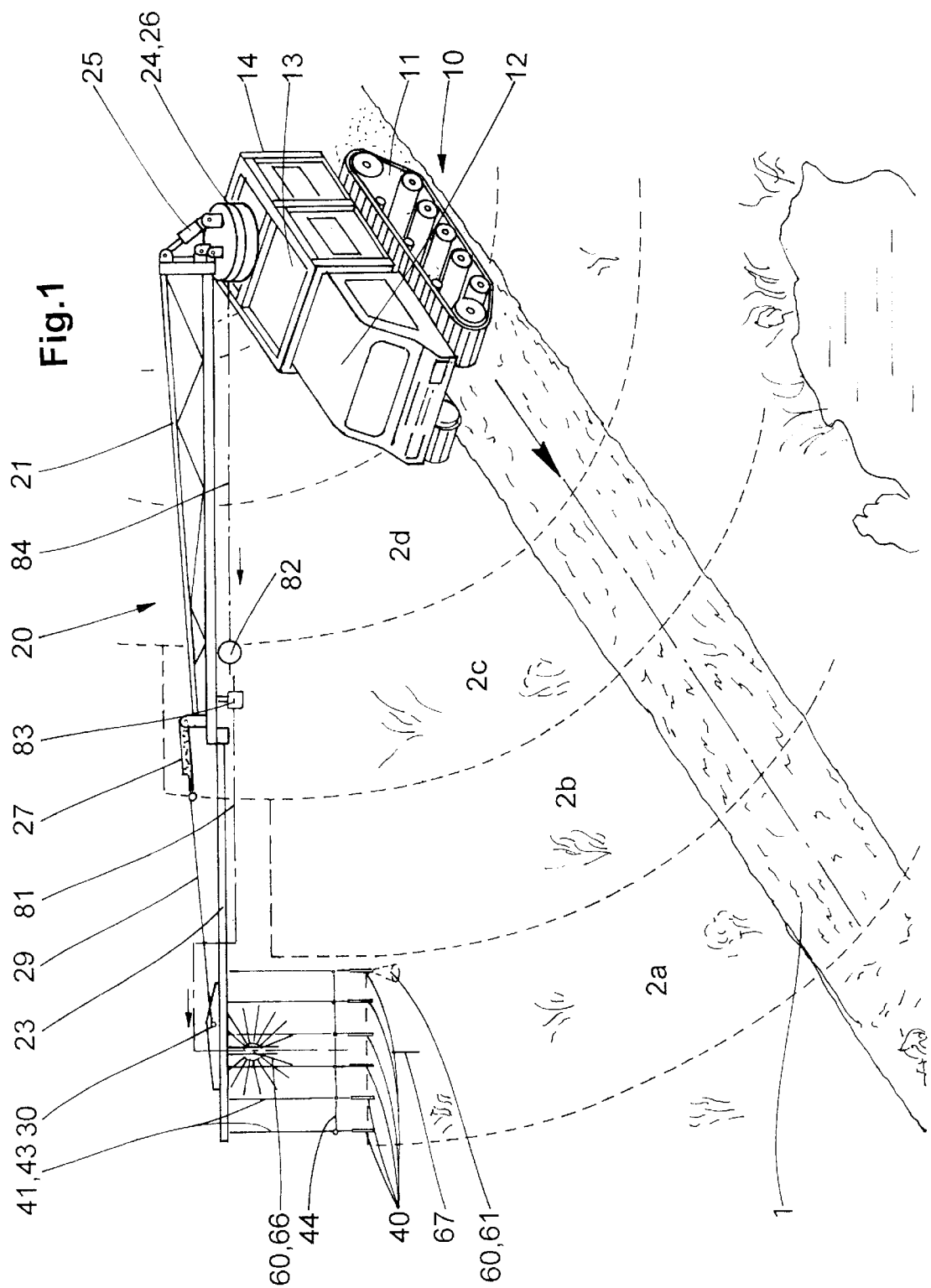
FIG. 1 shows a perspective representation of a device of the invention in the terrain to be examined.

In FIG. 1, the device for detecting objects 6 located in the ground is represented in perspective on a terrain to be investigated, in which first of all a travel path 1 has been produced by means of a suitable munitions clearing device. If a large terrain is to be searched, several travel paths 1 are laid down parallel to one another, whose distance can amount to 20 to 30 m. The mobile device 10, which is represented as a tracked vehicle in the embodiment depicted here, moves in this travel path 1. Behind the driver's cab 12 of the mobile device 10, there is situated a personnel and testing room cabin 13 which is enclosed by a frame 14 on which a jib 20, positioned over the roof, is mounted, the jib having an arrangement of several measuring heads 40 on its free end.

The dimensions of the vehicle 10, and here especially the tracks 11, are laid out such that despite the great overall weight of the device only a small surface pressure is exerted on the ground of the travel path 1. This is necessary so that explosive objects, which are situated in deeper lying layers of the ground of the travel path 1 and which were not yet found by the travel path clearing vehicle, cannot be caused to explode. Furthermore, the vehicle 10 is suitable for roads and fording. The speed of the vehicle 10 is steplessly regulable.

The jib 20 is constructed in two parts from a rear jib 21 and a front jib 23, wherein the rear jib 21 is attached on a swivelling platform 24. The jib 20 is moved back and forth around a vertical axis by means of the swivelling device 26 mounted in the swivelling platform 24, so that the measuring heads 40 sweep over arc-shaped surface strips 2a–2d, whereby for reasons of safety even the corresponding area of the travel path 1 is searched. After a surface strip 2a–d has been searched in this way, the vehicle 10 is moved further by a strip width and the jib 20 swivelled again. The length of the jib can amount to 20 m, whereby a terrain strip with an arrangement of six measuring heads 40 can have a width of 3 m and more. With this dimensioning of the device, it is possible to search about 1 to 2 hectares of terrain for explosive objects within an hour.

The following measuring systems, for example, can be used as measuring heads:

1. Magnetometer for detection of Fe materials,
2. Magnetic field variometer for detection at greater traveling speeds,
3. Sensors for measuring the electrical conductivity of the soil with low frequency signal (up to 100 KHz), whereby foreign bodies in the soil which alter the electrical conductivity of the homogenous soil structure can be detected up to 20 m deep,
4. Geo-radar, which operates in the high frequency range of 100 MHZ–2 GHz.

Foreign bodies which deliver a response signal for the high frequency measuring signal, including excavations in the soil, abrupt structural changes such as cavities, deposit edges etc., can be detected up to 20 m deep. In all cases, preferably an electronic data processing assisted evaluation of the measurements is undertaken in the test room cabin 13.

In order to be able to adjust the measuring heads 40 at a predetermined distance over the terrain strips 2a–d to be examined, a first lifting cylinder 25 is mounted on the swivelling platform 24 and a second lifting cylinder 27 is mounted on the front end of the rear jib 21, which engages in fulcrum 30 on the front jib 23 through an activation rod 29.

The measuring heads 40 are suspended freely swinging on the front jib 23 in a row alongside one another on cords 43, wherein the cord 43 can be identical with the measuring conduit 41. Above the measuring heads 40, the cords 43 are connected with one another by a connecting cord 44 or a damping connection element, so that an uncontrolled swinging back and forth by the measuring heads 40 prevented. The suspension depicted here is designated as parallelogram suspension, because the measuring heads 40 are arranged parallel to the front jib 23 in every position of the front jib 23 and hang vertically, so that a vertical measuring direction is also always guaranteed. This becomes clear in FIG. 2, where the measuring head arrangement can be adapted to the slope inclination.

The travel and swinging movements of the vehicle 10 and the jib 20 are executed by the driver as long as no bomblets etc. are detected by the measuring heads. If, however, one or more of the measuring heads 40 detect objects in the ground, this is indicated by the evaluating apparatus located in the personnel and test room cabin 13, and the swinging control of the jib is then conducted by the operator (navigator) of the measuring instruments by override. The navigator swings the jib 20 back and forth until the find site is precisely established on his indicator. Thereafter, the ground marking device 60 is activated. This includes a stake marking device 66 arranged on the free end of the front jib 23 for rough marking and paint marking devices 61 allocated to the measuring heads 40 for fine marking. Both devices will be described in further detail in connection with FIGS. 11 to 14.

In order not to influence the measurement sensitivity of the measuring heads 40 unfavorably, the front jib 23 is manufactured from non-magnetizable material. This also requires that the ground marking device 60 likewise consist of non-magnetizable component parts and be so operated that no electromagnetic disturbance fields occur. In the embodiment depicted here, the stake marking device 66 and the paint marking device 61 are therefore operated by a compressed gas, especially compressed air.

From a main air container located on the vehicle 10, compressed air is pumped through a gas conduit 84 with a small cross section into an intermediate container 82 which is installed on the front section of the rear jib 21. The intermediate container here fulfills a storage function. Should the stake marking device 66 be activated, then the switchable valve 83 arranged adjacent to the intermediate container 82, which can be a magnetic valve, is activated by the navigator so that the gas stored in the intermediate container 82 abruptly escapes through the gas conduit 81, which has a larger cross section in comparison with gas conduit 84. The escaped gas reaches the stake marking device 66 with little resistance where it is conducted to the stake 67 ready for discharge. The pressure applied suffices to press the stake 67 out of its mounting and shoot it into the soil. The gas pressure and the amount of gas of the intermediate container 82 are adapted to the necessary shooting energy of the marking stake.

In the representation shown here the stake marking device 66 is arranged approximately centrally among the measuring heads 40. It is also possible to provide several stake marking devices 66 beside each other in order to designate the find site more exactly. The stakes 67, which likewise do not consist of magnetizable material, preferably have a luminous paint so that the find sites are recognizable even from a great distance.

Should a fine marking be undertaken in addition, then the navigator activates the paint spraying device 61, which basically has arranged alongside the respective measuring head 40 a valve with spraying nozzle and a corresponding supply conduit. A colored liquid is sprayed by means of a compressed air surge at the place on the soil where the allocated measuring head 40 has detected an explosive object.

Figure 2:
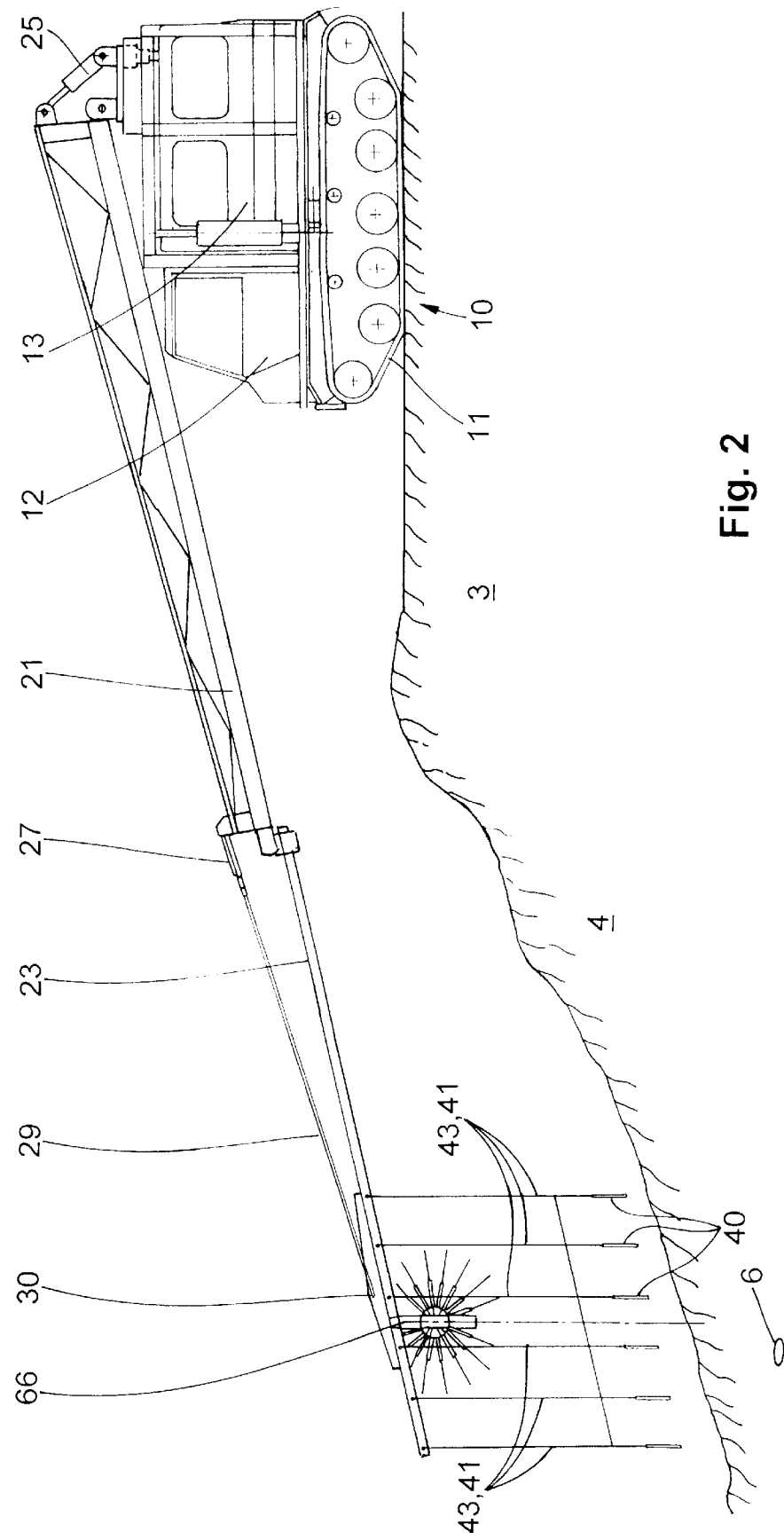
FIGS. 2, 3 and 4 show the device in side view in various uses.

In order to make the range of use of the device of the invention clear, the vehicle 10 in FIG. 2 is positioned on an elevation 3, from which it is exploring a slope 4 in which explosive objects 6 are situated. The connection of the cords 43 or measuring conduits 41 ensures that when the front jib 23 is inclined upward or downward, the complete measuring head system always behaves like a parallelogram, and the measurement by the measuring heads always takes place vertically. By suitable displacement of the lifting cylinders 27 and 25, the front jib 23 can be so inclined that the distance of all measuring heads from the surface of the incline 4 is basically of equal size. By means of lifting cylinders 25, 27, an independent swivelling about the horizontal axis of the rear jib 21 or of the front jib 23 is possible. The stake marking device 66 is likewise suspended swinging, so that it always hangs vertically downward following the center of gravity.

Figure 3:
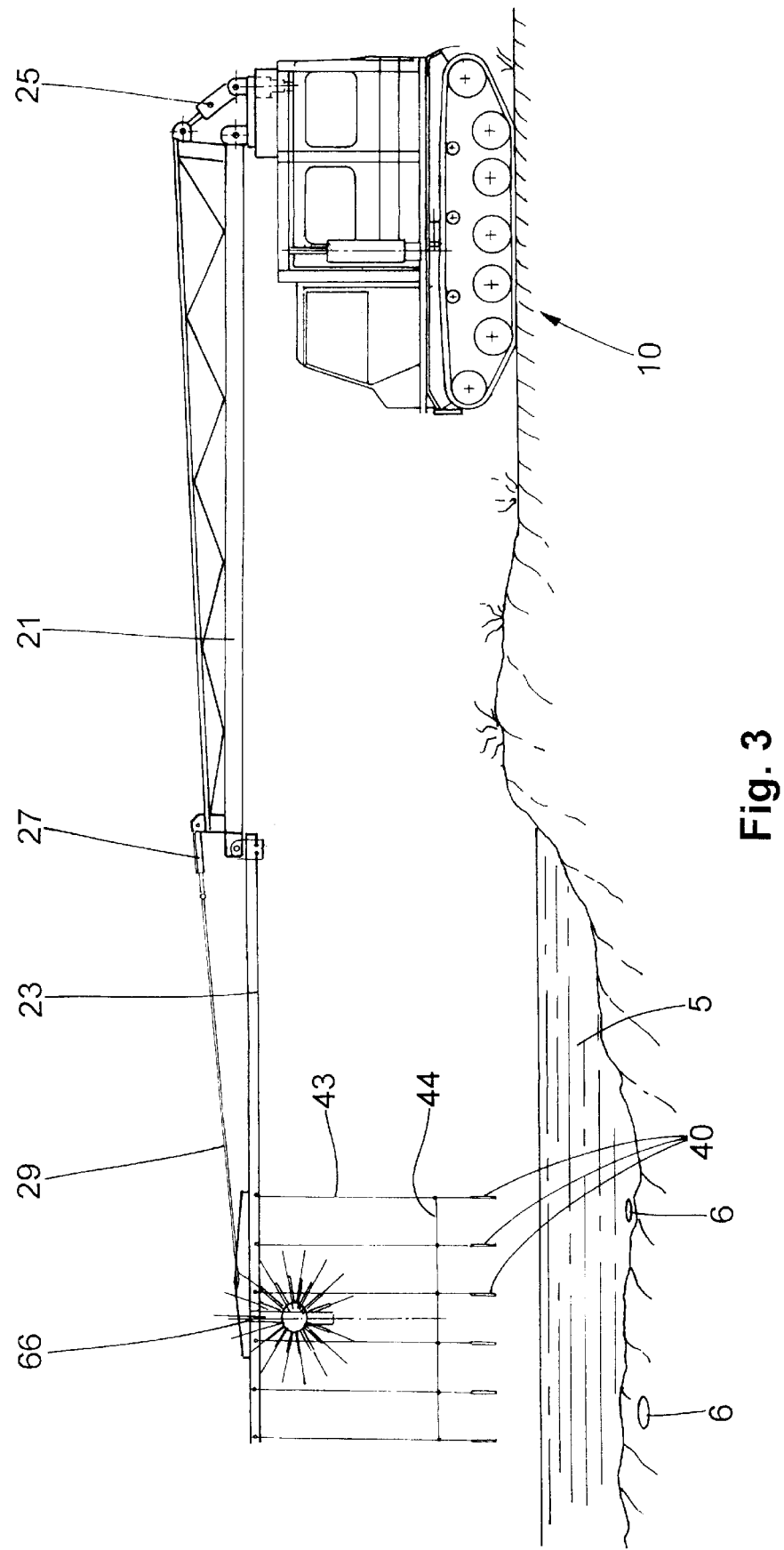

In FIG. 3 use over a body of water 5 is represented. Because of the great length of the jibs 21, 23, not too large a body of water can consequently be searched for explosive objects 6 from the shore.

Figure 4:
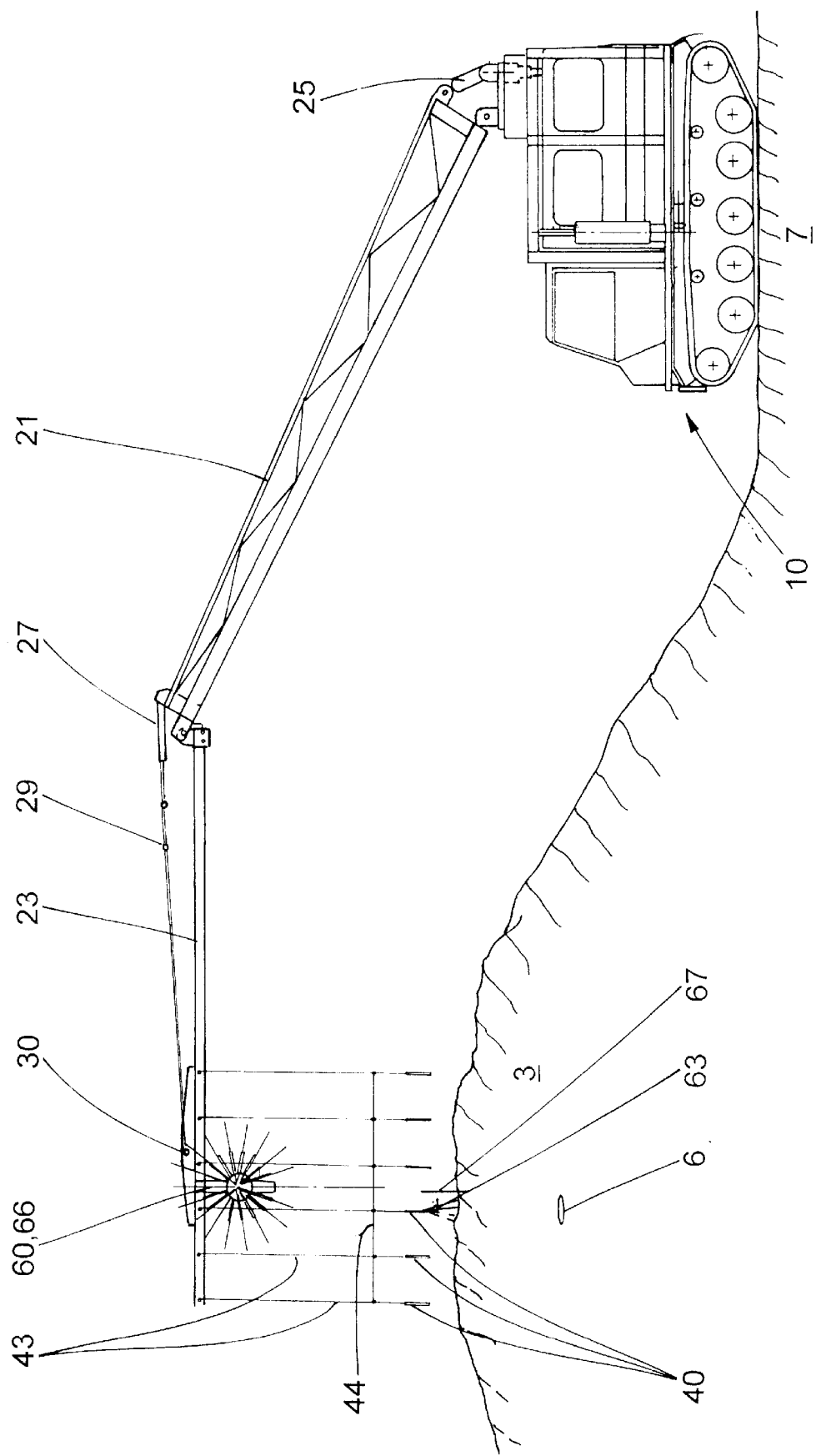

In FIG. 4 the vehicle 10 is situated in a depression 7, from which an elevation 3 can be examined for explosive objects 6. Since it is a matter of a horizontal plateau here, the rear jib 21 is swivelled upward by means of the first lifting cylinder 25, and the front jib 23 is aligned horizontally by appropriate activation of the second elevation cylinder 27, so that all measuring heads 40 have the same distance from the surface of the earth. When adjusting the jibs 21, 23, an uncontrolled swinging of the measuring heads 40 fastened to the cords 43 would occur if these where not joined to one another through a connecting cord 44. The mutual coupling of the cords 43 suppresses the swinging motion. The cords 43 can also be replaced by vertically swinging rods of non-magnetizable material with a damping device installed on the suspension. In this case, the connecting cord 44 is unnecessary.

Figure 5:
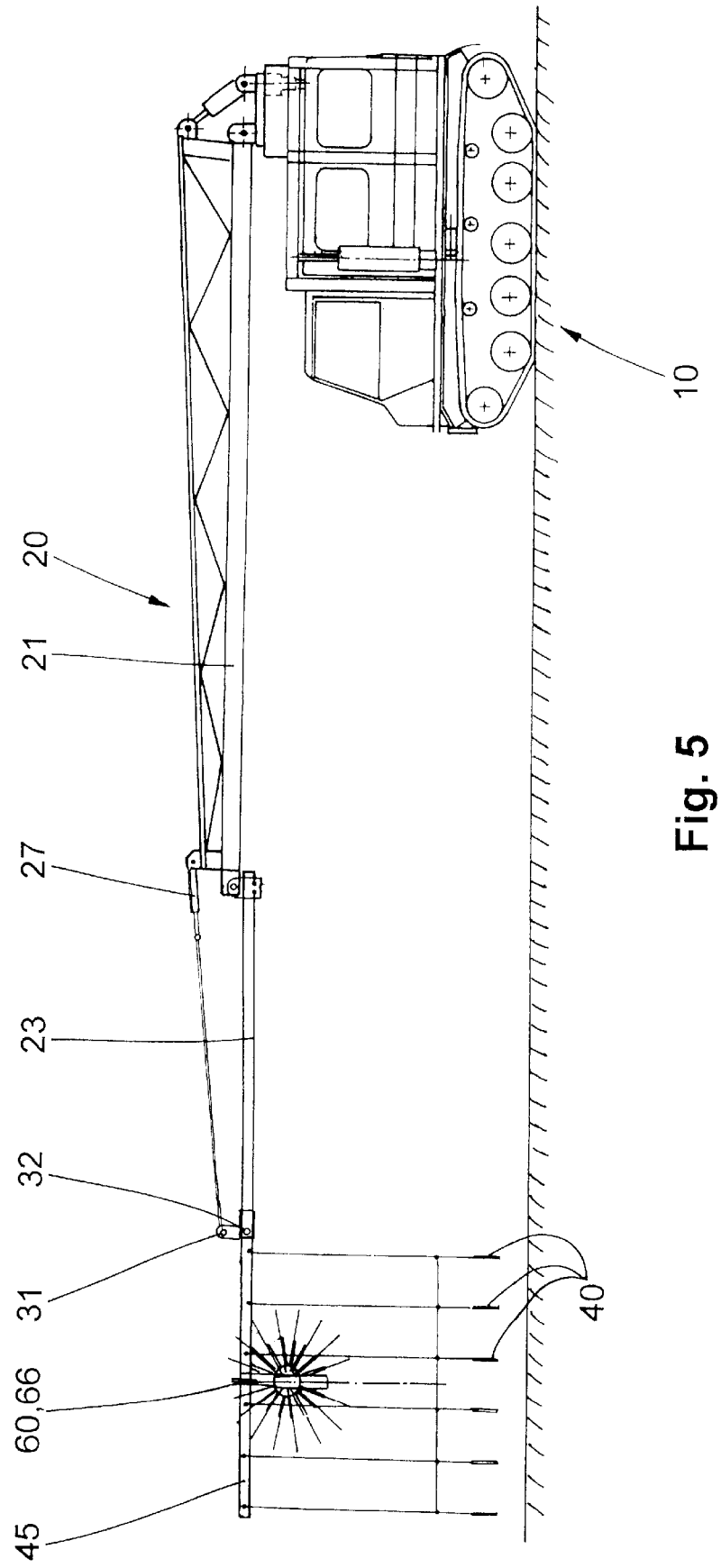
FIG. 5 shows the device in side view in accordance with a further embodiment.

In FIG. 5 a further embodiment of the jib 20 is represented. While in the preceding figures the activation rod 29 fastened on the second lifting cylinder 27 is pivoted on the front jib 23 at point 30, here the activation rod 29 is pivoted on the probe holder 45. The front jib 23 is rigidly connected with the rear jib 21, and the probe holder 45 is pivotably mounted on the front jib 23 about fulcrum 32 around a horizontal axis. By activating the second lifting cylinder 27, the probe holder 45 can be swivelled. The probe holder 45 basically consists of a non-magnetizable rod or tube on which the cords 43 of the measuring heads 40 are suspended swinging freely. This embodiment has the advantage that the measuring heads 40 can be aligned without the distance from the vehicle 10 essentially being changed, as this is the case with a suspension on the front jib 23. Furthermore, there also exists a slope influence of the probe mounting 45 with greater differences in height between travel and measuring planes.

Figure 6:
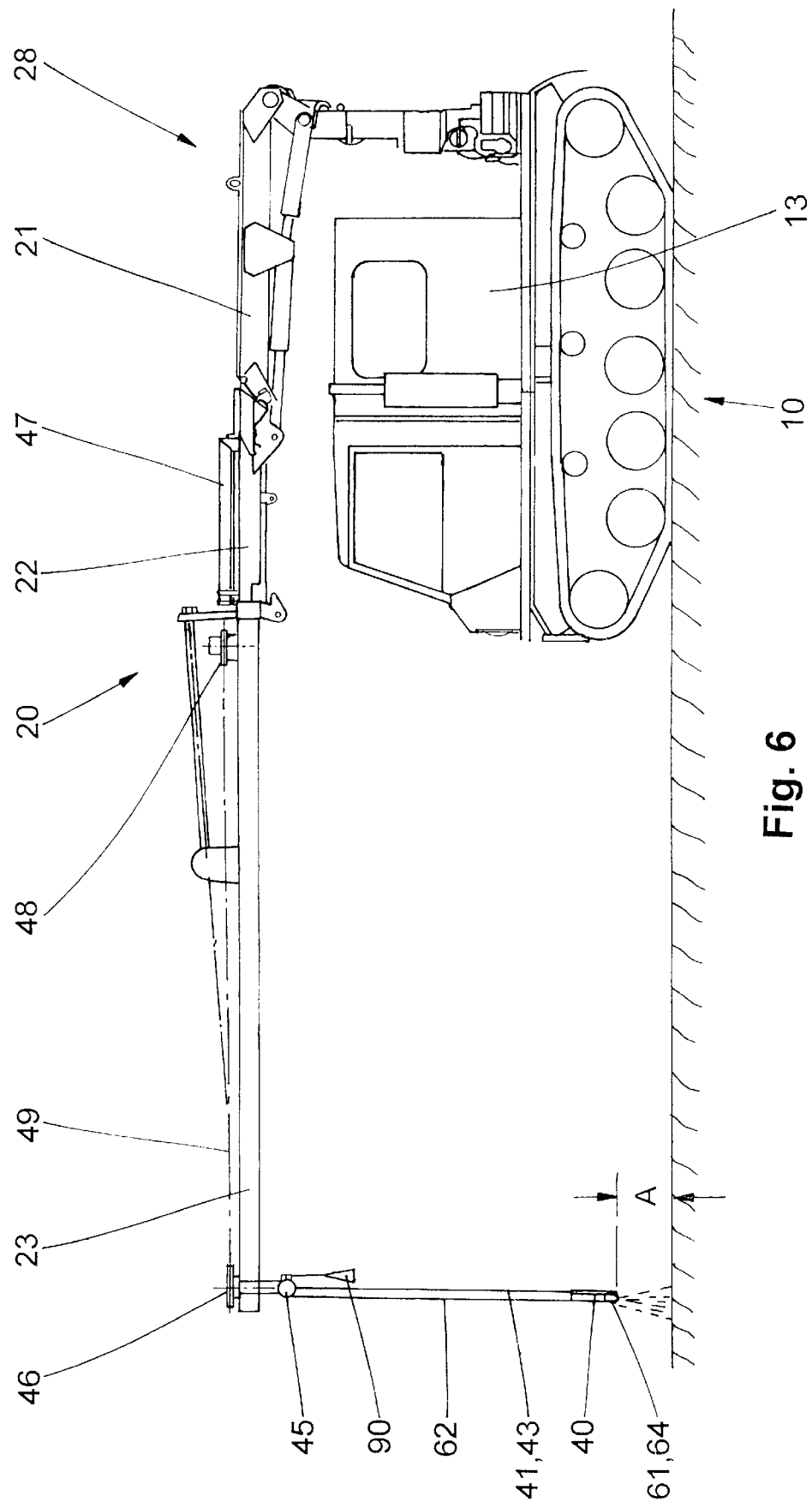
FIG. 6 shows the device in side view in accordance with a further embodiment.

In FIG. 6 a further embodiment of the vehicle 10 is represented. Owing to the abbreviated construction of the test room cabin 13, the jib 20 can be attached to the chassis of the vehicle 10. In the representation shown here, a conventional mobile crane 28 is used for the jib 21, on whose front end the front jib 23 is hinged. The displacement possibilities of the rear and front jibs 21, 23 correspond to those of previously described embodiments. If necessary, an intermediate jib 22 can be provided between the two jibs 21, 23.

The measuring heads 40 are suspended on the probe holder 45, whereby this is aligned perpendicular to the direction of travel. It can be seen in this representation that in the direction of travel in front of the respective measuring head, a valve 64 and a spraying nozzle 63 are arranged, by means of which the paint for marking the find site is sprayed on the soil. The spraying nozzle 63 is supplied through the paint pressure conduit 62, which is likewise suspended freely swinging.

The probe holder 45 is rotatably arranged on the front jib 23 and can be rotated around a vertical axis by means of the electrically operated swivelling roller 48 and the swivelling roller 46 as well as the driving cord 49. The swivelling roller 48 with electric drive has the job of constantly aligning the probe holder 45 at right angles to the direction of travel according to the swing position of the rear jib 21. With the aid of the linear drive device 47, the intermediate jib 22 can be lengthened or shortened.

Figure 7:
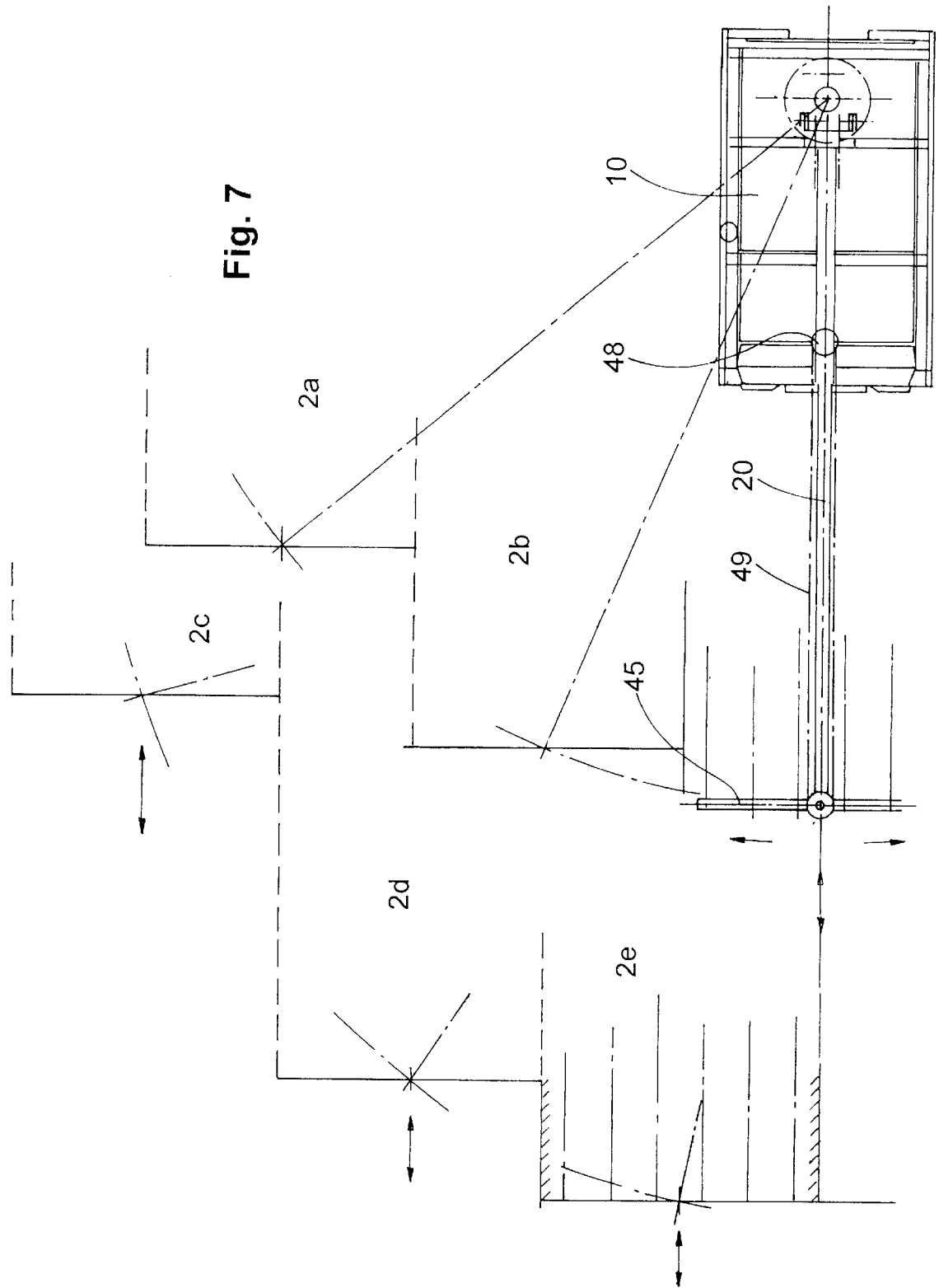
FIGS. 7 and 8 show the device in plan view.

An appropriate working example is represented in FIG. 7. The probe holder 45 covers a surface strip with the measuring heads 40 mounted on it, which is wider than the vehicle 10. This is especially advantageous when the ground in front of the vehicle 10 is to be searched as well. The jib 20 can be swung into a predetermined position, wherein the probe holder 45 is aligned at right angles to the direction of travel corresponding to this deviation. If the vehicle 10 is moved continuously, parallel surface strips 2a, 2b or 2c, 2d and 2e can consequently be searched for explosive objects. With each trip by the vehicle 10, the jib 20 and the probe holder 45 are brought into the new position. Stopping the vehicle, as is the case in the operating mode in accordance with FIG. 1, is not necessary here.

Figure 8:
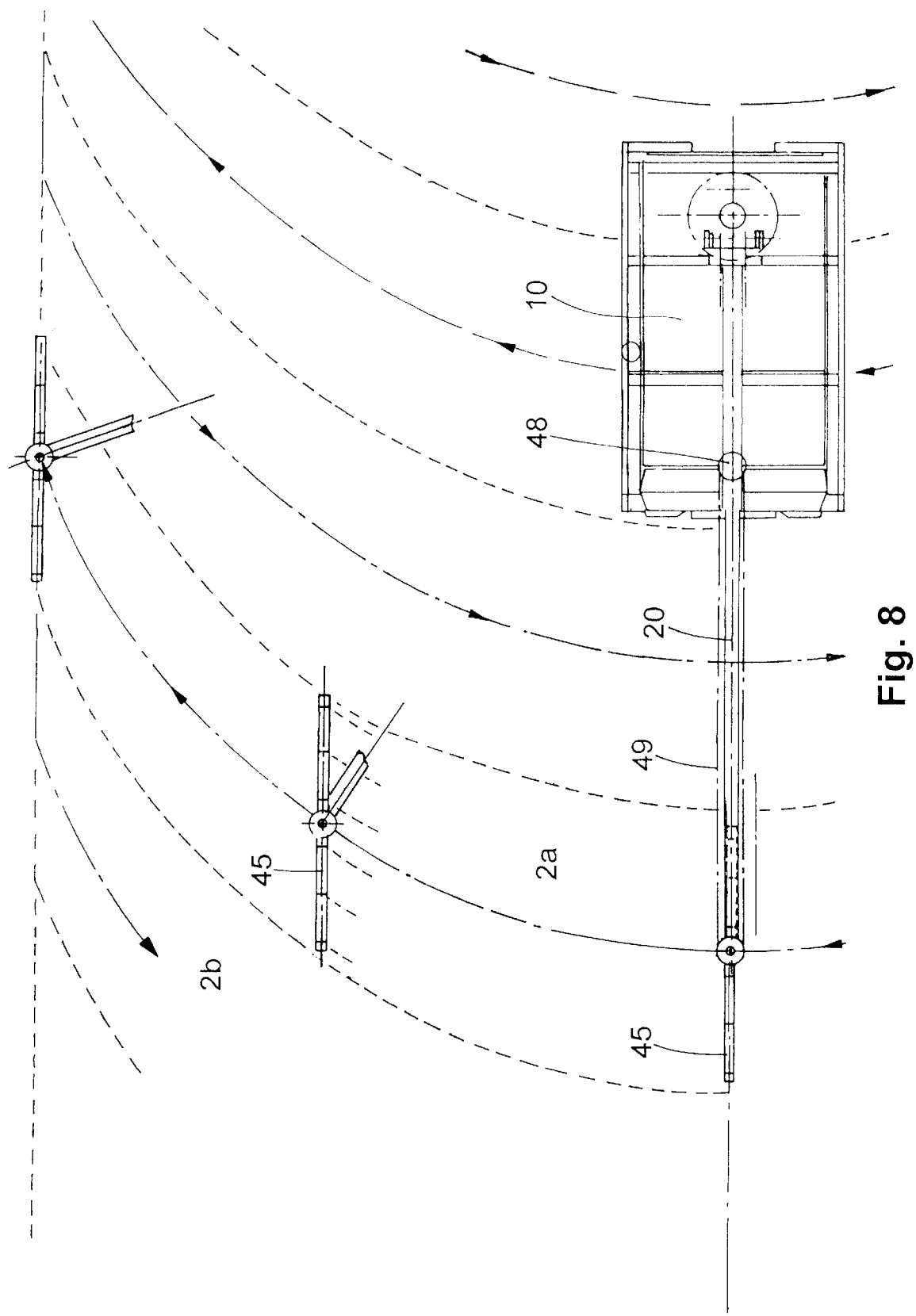

But even when executing swivelling motions according to FIG. 1, it can be advantageous to reset the probe holder 45 correspondingly. A working example is represented in FIG. 8. During the swinging of the jib 20 the probe holder 45 is reset, such that it is always aligned in the direction of travel. The surface strip 2a swept over hereby narrows toward the outside, which, however, has the advantage that the margin of the area to be examined is precisely recorded. When the outer swivelling position is reached, the vehicle 10 can be moved along, and the swivelling movement of the jib 20 is conducted in the opposite direction, whereby the probe holder 45 is likewise reset. The swivelling movement is represented by the arrows drawn in.

Figure 9:
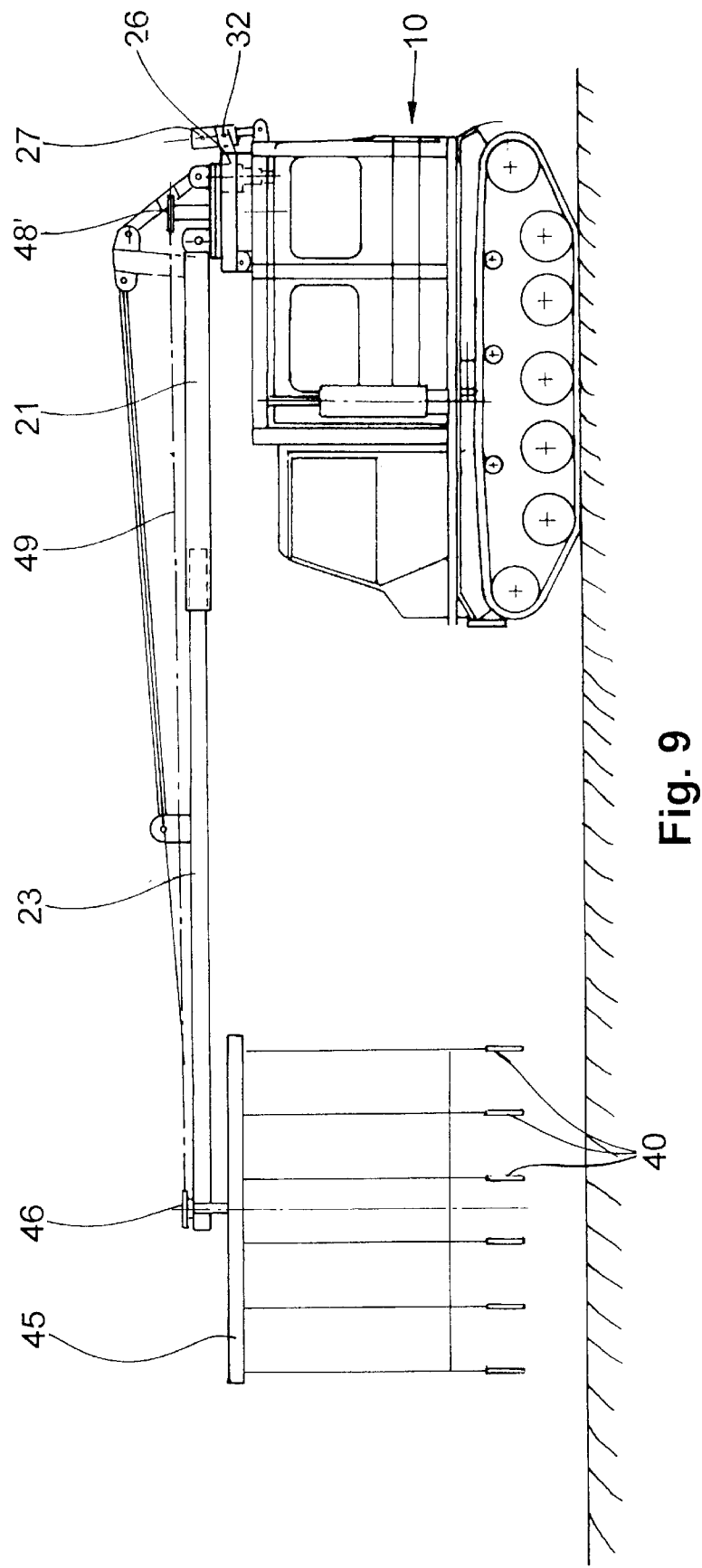
FIG. 9 shows the device in side view in accordance with a further embodiment.

FIG. 9 depicts an embodiment with a bent front jib 23 to which the measuring heads 40 are basically rigidly fastened. The measurement heads 40 can be attached to the front section 34 of the front jib 23 by elastic elements 50 which, for example, can be constructed in the form of a bellows. On the one hand, a rigid attachment is guaranteed in this way, so that even when raising the front jib 23 out of position I, the measuring heads 40 retain their arrangement in relation to the jib 23 (see position II). It is thereby possible to align the direction of measurement of the heads 40 perpendicular to the surface of a slope 4. The rigid attachment of the measuring heads 40 is to be understood such that, upon encountering an obstacle, a deviation of the measuring heads 40 is still possible.

Figure 10:
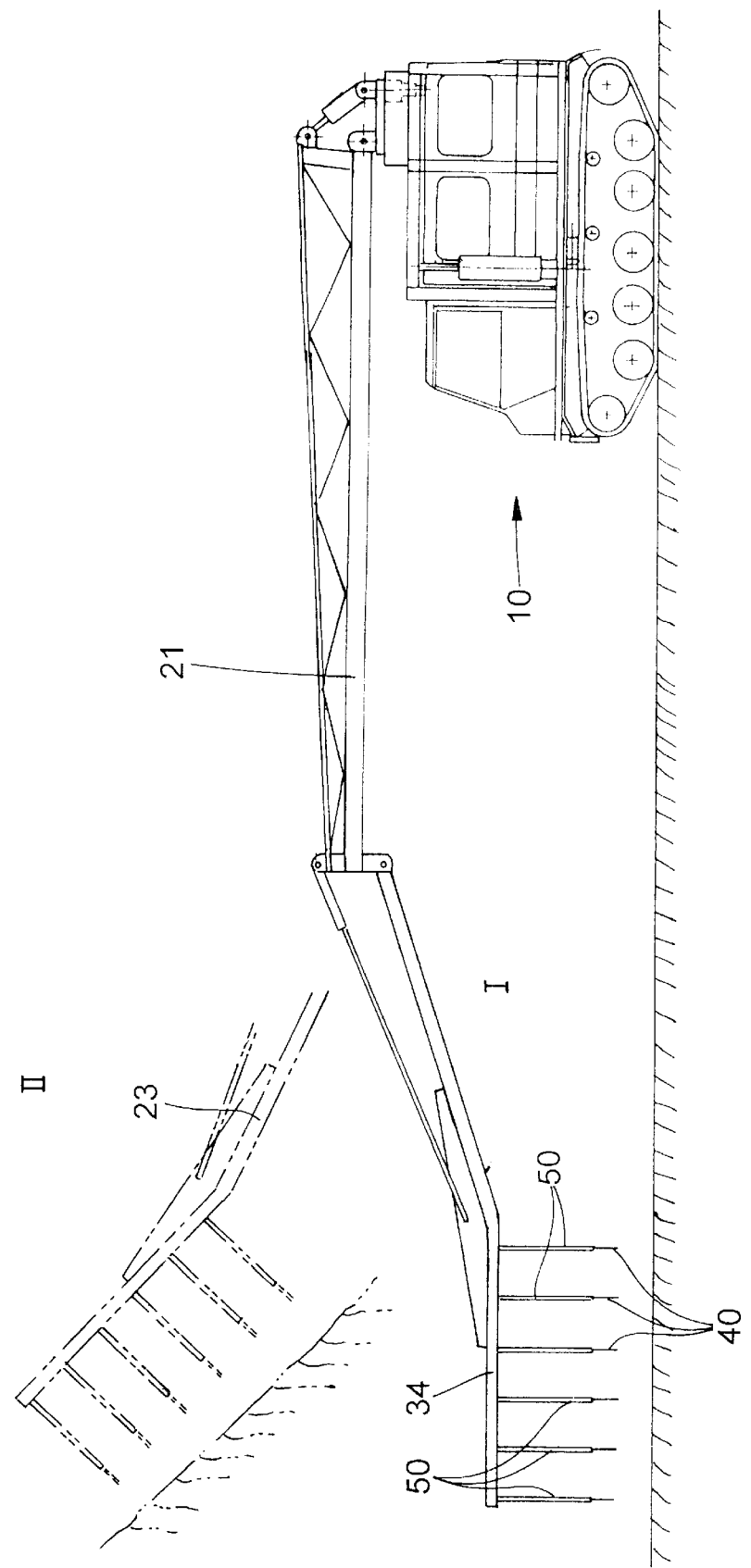
FIG. 10 shows the stake marking device in front view.

In FIG. 10 the stake marking device 66 is represented in enlargement. A mounting 85 is suspended swinging on the front jib 23, which mounting is connected with the rotary transmission 76. On the rotary transmission 76, a mounting star 68 is pivotably mounted. The mounting star 68 has guide tubes 69 arranged in a star-shaped manner, which are equipped with stakes 67. Coupled with the mounting star 68 is a winding drum 87, to which a rubber tension belt 72 is fastened, which passes over a guide pulley 86 fastened to the mounting and is attached to the mounting 85. Charging the mounting star 68 takes place manually by introducing the marking stakes 67 until reaching a stop location. By insertion in the sequence indicated a prestressing is reached with the aid of the rubber tension belt 72 which suffices for a complete rotation of the mounting star 68. The marking stake situated in the shooting position lies against a stop 70 of the mounting 85. When this stake is shot off, the mounting star 68 rotates further owing to the tension of the rubber tension belt 72 until the succeeding stake 67 lies against the stop. After shooting off the last stake, the stop 71 of the guide tube 69 lies against stop 70.

Figure 11:
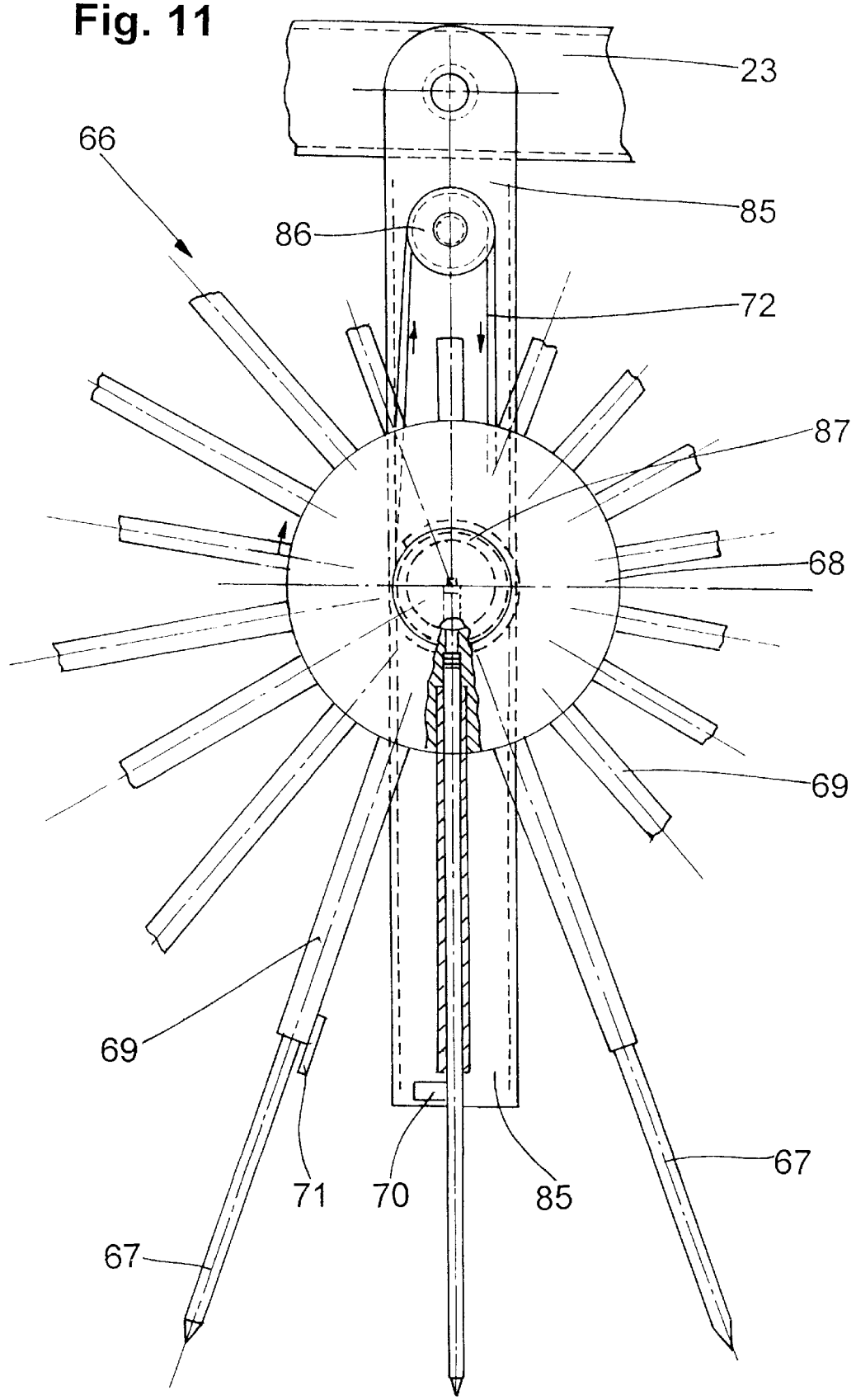
FIG. 11 shows the stake marking device illustrated in FIG. 10 in side view and partially in section.

In FIG. 11 the stake marking device 66 represented in FIG. 10 is shown in side view. The front jib 23 is represented as a plastic tube in which the compressed air conduits 77 and 62 as well as the measurement conduit 41 are laid. The compressed air conduit 77 leads to the rotary transmission which accommodates the mounting star 68. The compressed air consequently arrives at the stake 67 located in the shooting position, which has at the upper end a locking groove 73, in which the locking pin 75 of a locking lever 74 engages. When the marking stake 67 is acted upon by a compressed air surge, the force of the locking lever 74 is overcome and the stake 67 is shot out of the guide tube 69.

The paint pressure conduit tube 62 has on its lower end a valve 64 with a spraying nozzle 63. Paint liquid is likewise sprayed through the spraying nozzle 63 under the action of pressure.

Figure 12:
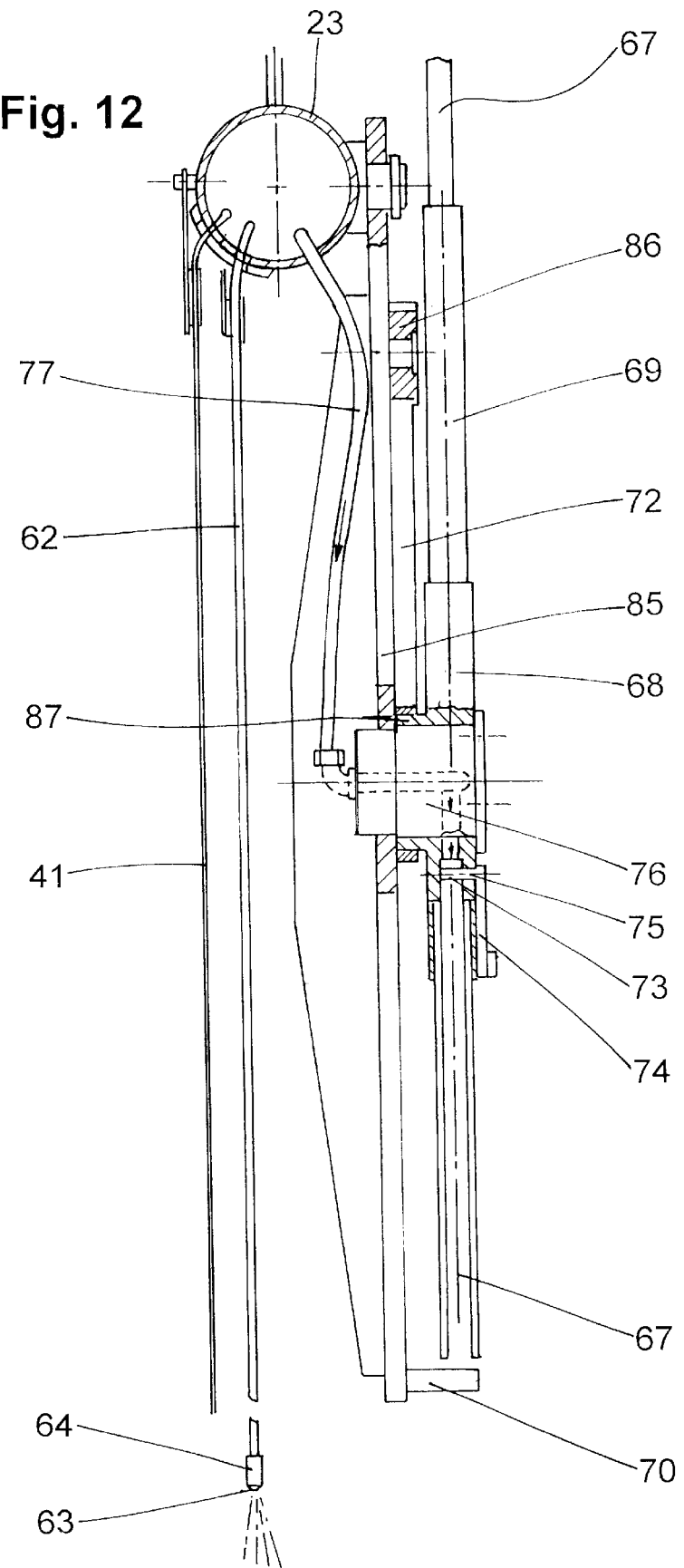
FIG. 12 shows the stake marking device in accordance with a further embodiment in side view and partial section.
Figure 13:
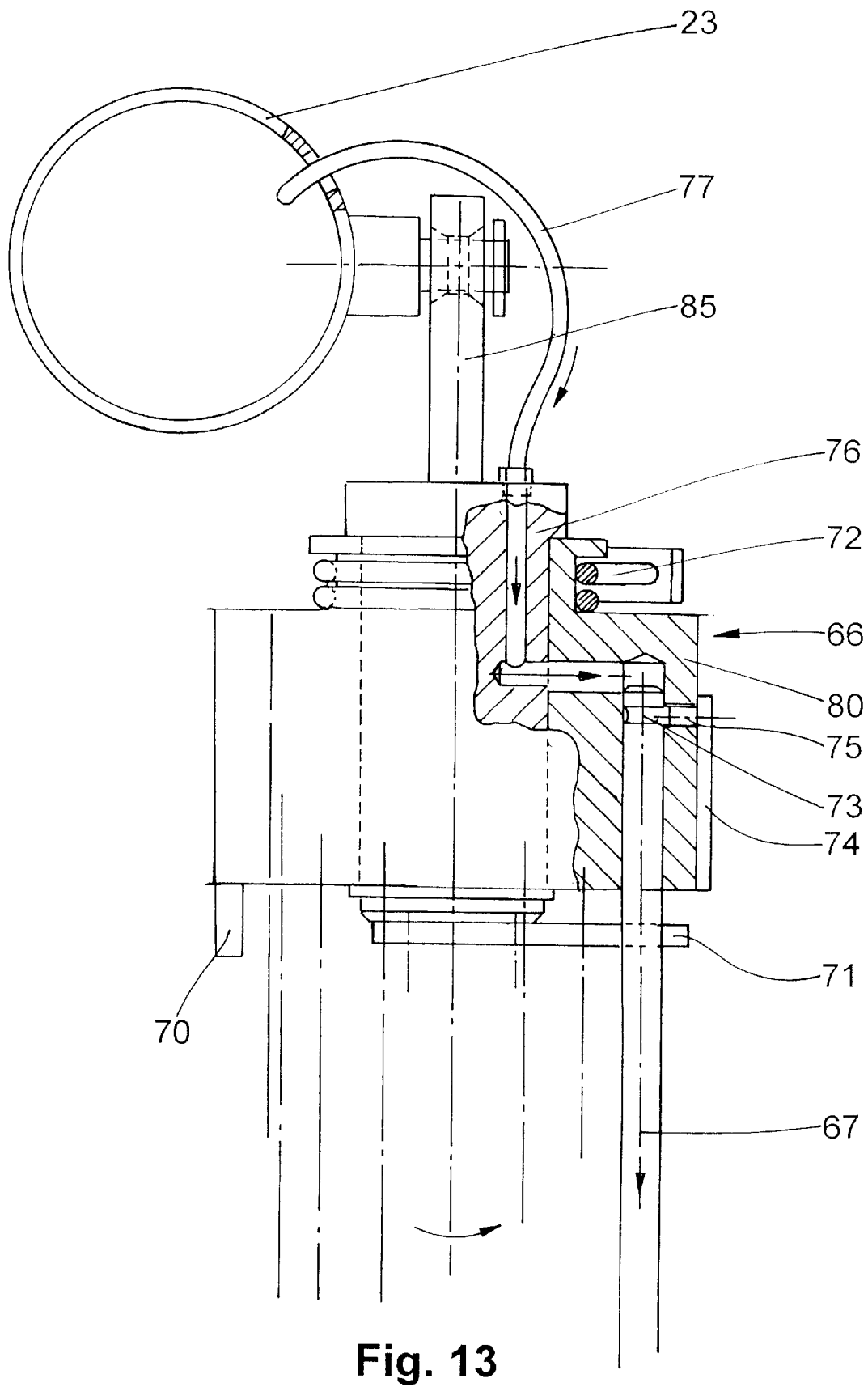
FIG. 13 shows the stake marking device illustrated in FIG. 12 in plan view.
Figure 14:
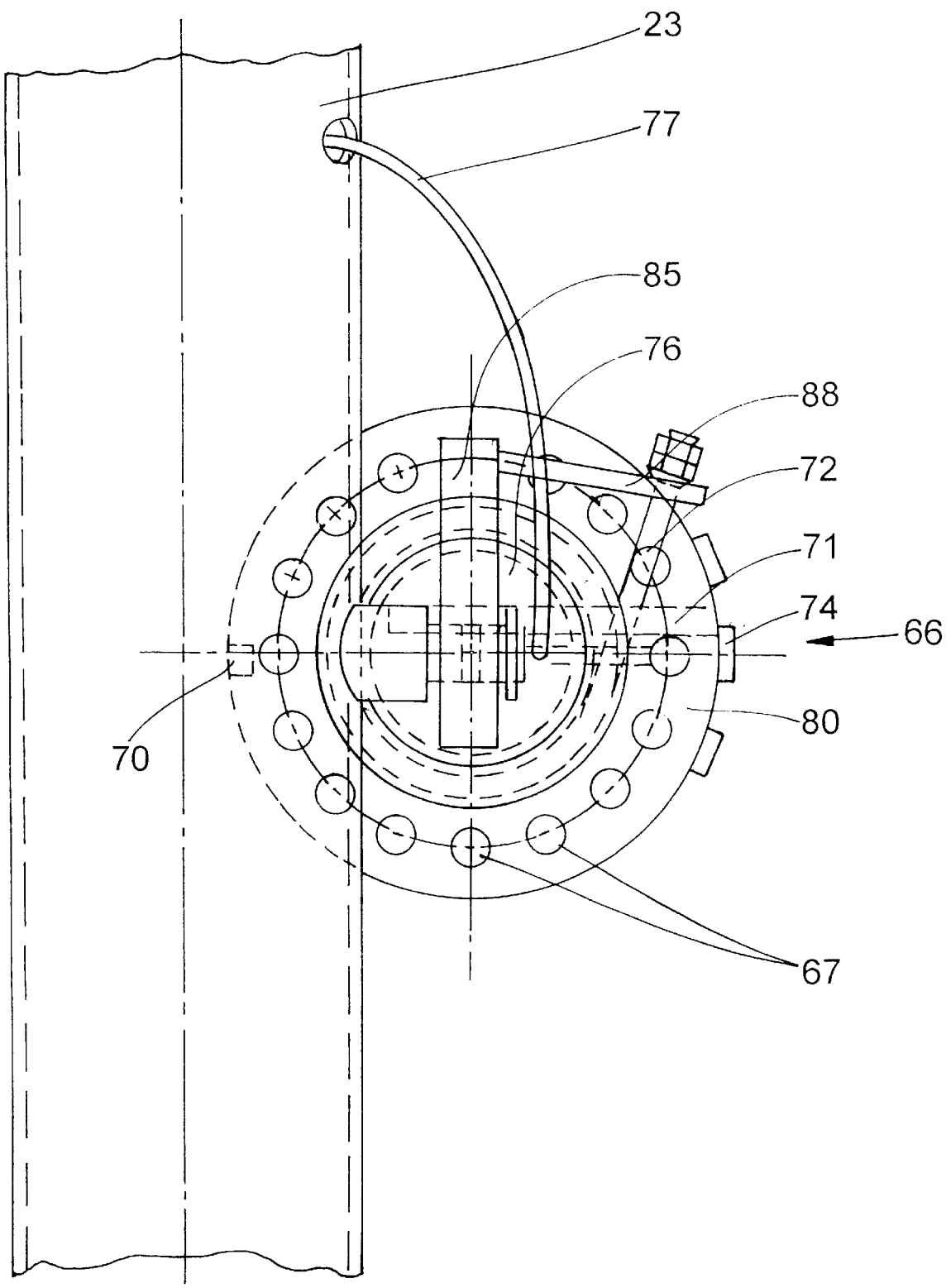
FIG. 14 shows the stake as marker buoy for a solid upper surface.

In FIGS. 12 and 13 a further embodiment of the stake marking device 66 is represented. The stakes 67 are arranged in a drum 80 which is swinging suspended by a mounting 85 on the front jib 23. The drive of the drum 80 likewise takes place by a rubber tension belt 72, which is wound over the upper end of the drum 80. A compressed air conduit 77 is likewise provided, which ends at the stake 67 located in the shooting position. The stake 67 situated in the shooting position is likewise held by a locking lever 74 by means of its locking pin 75. When a compressed air surge is emitted through the compressed air conduit 77, this is shot out of the drum 80, which immediately moves on into the next position. Corresponding to the previously described embodiments, stops 70, 71 are also provided here.

When all stakes 67 have been shot off, the mounting drum 80 is rotated so far in the direction of the arrow that the stop 70 strikes upon stop 71, which is fastened to the lower end of the rotary transmission 76 and consequently prevents a further rotation of the drum 80 in relation to the rotary transmission 76. This way a total unstressing of the tension belt 72 is prevented and loading is simplified.

With too hard or stony soils, a marking buoy 100 is used as stake 67. It functions in accordance with FIG. 14 according to the gravity self-uprighting principle and is subject to the condition $m_1.a_1 > m_2.a_2$. The shaft 102 should be constructed as lightly as possible, and has a locking groove 73 for accommodation into the stake marking device. The relatively heavy lower part 101 has the object of moving the marker buoy 100 into a standing position from any position. The hollow space 103 is so proportioned that the upright buoy can float.

I claim:

1. Apparatus for detecting objects located in the ground, especially explosive objects, such as unexploded mines, grenades, munitions or bombs, with a mobile device on which a jib (20) swivellable at least about a vertical axis is arranged, on whose free end several measuring heads (40) are arranged, characterized in that the jib (20) is constructed in at least two parts of a rear jib (21) and a front jib (23), wherein the front and the rear jibs (21, 23) are swivellable in vertical direction independently from each other, that the measuring heads are arranged alongside one another for sweeping over strip-shaped surface areas (2a–d) of the terrain to be investigated, and that at least one ground marking device (60) for distinguishing the find site determined by the measuring heads (40) is allocated to the measuring heads (40) on the free end of the jib (20).

2. Apparatus according to claim 1, characterized in that the mobile device (10) is a vehicle with high stationary moment and low surface pressure.

3. Apparatus according to claim 1, characterized in that the mobile device (10) has a test room cabin (13) in which evaluation apparatus for the evaluation of the measuring head signals as well as installations for overriding control of the mobile device (10) are accommodated.

4. Apparatus according to claim 3, characterized in that the jib (20) is attached to the chassis of the mobile device (10) or on a frame (14) enclosing the test room cabin (13).

5. Apparatus according to claim 1, characterized in that at least the front jib (23) comprises non-magnetizable material, preferably plastic.

6. Apparatus according to claim 1, characterized in that between the front jib (21) and the rear jib (23) an intermediate jib (22) is arranged, which is telescopable by means of a linear drive device (47).

7. Apparatus according to claim 1, characterized in that a soil distance measuring device (90) is mounted on the front jib (23).

8. Apparatus according to claim 1, characterized in that the measuring heads (40) are suspended freely swinging from the front jib (23) or a probe holder (45) arranged on the front jib (23).

9. Apparatus according to claim 8, characterized in that the measuring heads (40) are fastened by a parallelogram suspension.

10. Apparatus according to claim 8, characterized in that the measuring heads (40) are suspended on cords (43) or on vibration-damping swinging rods.

11. Apparatus according to claim 8, characterized in that the probe holder (45) is rotable around a vertical and/or horizontal axis.

12. Apparatus according to claim 1, characterized in that the measuring heads (40) are rigidly attached to the front jib (23) or a probe holder (45) arranged on the front jib (23) through pliable elements (50).

13. Apparatus according to claim 1, characterized in that the ground marking device (60) includes a paint spraying device (61) mounted adjacent to each measuring head (40) for fine marking.

14. Apparatus according to claim 13, characterized in that the paint spraying device (61) and/or the stake marking device (66) comprises non-magnetizable material and can be activated by compressed gas.

15. Apparatus according to claim 1, characterized in that the ground marking device (60) includes a stake marking device (66).

16. Apparatus according to claim 15, characterized in that the stake marking device (66) has at least one rotable mounting star (68) or a rotable mounting drum (80) which is outfitted with stakes (67).

17. Apparatus according to claim 16, characterized in that the stakes (67) are constructed self-uprighting as marker buoys (100).

18. Apparatus according to claim 16, characterized in that the stakes (67) are constructed so as to be floatable.

* * * * *